United States Patent [19]
Weber

[11] Patent Number: 5,536,122
[45] Date of Patent: Jul. 16, 1996

[54] EXPANSIBLE ANCHOR AND METHOD OF MAKING THE SAME

[75] Inventor: Wilfried Weber, Schopfloch-Unteriflingen, Germany

[73] Assignee: fischerwerke, Artur Fischer GmbH & Co KG, Waldachtal, Germany

[21] Appl. No.: 298,321

[22] Filed: Aug. 29, 1994

[30] Foreign Application Priority Data

Sep. 24, 1993 [DE] Germany .......................... 43 32 558.0

[51] Int. Cl.$^6$ .............................. F16B 13/04; F16B 13/06
[52] U.S. Cl. .................... 411/33; 411/55; 411/59
[58] Field of Search .................. 411/32, 33, 21, 411/55, 43, 69, 70, 59

[56] References Cited

U.S. PATENT DOCUMENTS 2,685,221  3/1954  Barrett .
4,270,434  6/1981  Bucheli ........................ 411/21
5,413,441  5/1995  Heminger et al. ............. 411/55

FOREIGN PATENT DOCUMENTS 3146518  1/1983  Germany .
3613911  10/1987  Germany .

*Primary Examiner*—Neill R. Wilson
*Attorney, Agent, or Firm*—Michael J. Striker

[57] ABSTRACT

An expansible anchor of metal for anchoring in a hole drilled in masonry has a bolt with several connected expander cones forming a thread and an expansible sleeve provided with an internal thread matching the expanding cones. To achieve high holding fores and low draw-in force, expansible portions are formed at uniform intervals along the internal thread of the expansible sleeve by U-shaped channels. The expansible sleeve is manufactured from powdered metal in an injection molding method using a system of binders combined with subsequent removal of binders and sintering, and an injection-molding tool having a removable thread core for the internal thread of the expansible sleeve.

8 Claims, 2 Drawing Sheets

EXPANSIBLE ANCHOR AND METHOD OF MAKING THE SAME

BACKGROUND OF THE INVENTION

The present invention relates to an expansible anchor and a method of making the same.

More particularly, it relates to an expansible anchor of metal having a bore and an expansible sleeve.

Expansible anchors and methods of their manufacture are known in the art. One of such anchors is disclosed for example in U.S. Pat. No. 2,685,221. The expansible anchor of metal disclosed in this reference is provided with a bolt which has several connected expander cones which form a thread. An expansible sleeve comprising two shells and provided with an internal thread is arranged on the expander cones. When the bolt is drawn into the expansible sleeve by a nut bearing against the article to be fastened, the expansible sleeve is pressed radially outwardly by the expander cones. Since the cones engage with the expansible sleeve over their entire length, the expansion of the expansible sleeve is substantially uniform over its entire length as well.

The expansible sleeve of the known expansible anchor includes two half shells provided with screw threads. When a bolt is drawn into the expansible sleeve, the half shells are pressed radially outwardly only in the expansion direction. Since the expansion direction is displaced by 90° to the slot plane, a line contact of the two half shells with the expansible sleeve, despite high draw-in force, allows only low anchoring forces. An increase in the draw-in force also occurs as a result of the thread in the half shells of the expansible sleeve matched to the threads forming the expander cones. When the bolt is drawn in, the cone regions of smaller diameter of the expansible sleeve are displaced on the cone regions of larger diameter of the bolt. Therefore a greater pressure is exerted on the longitudinal edges of the half shells and, because of the rigidity of the half shells, increases the draw-in force without reinforcing the expansion effect and therefore the holding force of the expansible anchor. Moreover, in the known expansible anchor the two shells have to be held on the bolt of the expansible sleeve by wire rings.

SUMMARY OF THE INVENTION

Accordingly, it is an object of the present invention to provide an expansible anchor and a method of its manufacture which eliminate the disadvantages of the prior art.

In keeping with these objects and with others which will become apparent hereinafter, one feature of the present invention resides, briefly stated, in an expansible anchor of the above mentioned general type, in which expansible portions are formed at uniform intervals along the internal thread of the expansible sleeve by U-shaped channels.

When the expansible anchor is designed in accordance with the present invention, it allows an expansion effective over the entire length of the expansible sleeve combined with high holding force, which can be mounted simply and with very little expenditure of effort and which can be manufactured inexpensively.

When the expansible sleeve of the expansible anchor has an internal thread along which a plurality of expansible portions are formed by U-shaped channels, by drawing-in the bolt, the expansible portions are pressed outwards independently of one another by the connected expander cones forming a thread. The individual expansible portions can therefore easily adapt to irregularities in a drilled hole and are uniformly distributed over the entire length and circumference of the expansion sleeve. The expansible portions attached only at one front edge to the expansible sleeve can be easily bent out so that little drawing-in force is required to expand the expansible portions. The uniform distribution of the expansible portions produces precise anchoring which nevertheless provides high holding forces.

In accordance with a further feature of the present invention, the lateral channels of two adjacent expansible portions can be combined to form one channel. When a web remains between the expansible portions and its inner wall has the cone contour of the internal thread, it is expedient to reduce the wall thickness of the web by grooves on the outer wall. Therefore in the region of the webs the expansible sleeve does not engage with the wall of the hole drilled in masonry. Due to the reduced wall thickness of the webs, they can be easily pressed away when the bolt is displaced axially with respect to the expansible sleeve. The drawing-in force is therefore virtually completely converted into expansion force for expansible portions. The reduction in wall thickness can be extended to the entire expansible sleeve with the exception of the expansible portions.

In accordance with a further feature of the present invention, a self-locking facility between the expansible sleeve and the bolt is provided, in order to prevent the bolt unscrewing from the expansible sleeve in the event of a tensile force acting on the bolt. The self-locking facility is obtained by pitch angles of the expander cones of the bolt arranged in a thread and of the expansible portions of the expansible sleeve between about 20° and 50°. With a pitch angle of 25° a favorable contribution of the expansible portions is obtained.

In accordance with another feature of the present invention, a clearance is provided between the threads of the expansible sleeve and the bolt and the pitch of the thread of the expansible sleeve is slightly steeper than the thread of the bolt. In this construction the expansible portions is positioned closer to the bottom of the drilled hole, are expanded first and somewhat more than the expansible portions lying closer to the mouth of the drilled hole. In this case a stress distribution matched to the higher load-carrying capacity of the component as the depth of the drilled hole increases is obtained.

The end face of the expansible sleeve can be closed at its insertion end. This prevents drilling dust getting into the expansible sleeve when the expansible sleeve is inserted in the hole drilled in masonry. Under certain circumstances this drilling dust hampers expansion. A limit for screwing-in the bolt is provided at the closed end face of the expansible sleeve, so that it is always correctly positioned in the expansible sleeve. Also, projections can be arranged at the rear end of the expansible sleeve and engage in the wall of the drilled hole for absorbing the torque acting on the expansible sleeve when the bolt is drawn in.

The expansible sleeve can be produced in a simple and inexpensive manner with the use of powder-injection molding method. In accordance with the inventive method the expansible sleeve is manufactured from powdered metal in an injection molding process with the use of a binder system with subsequent removal of the binders and sintering. In order to mold the internal thread of the expansible sleeve, a removable thread core is utilized. The tool for manufacturing the metal expansible sleeve substantially corresponds to a plastic material injection molding tool. In the injection molding tool only the contraction of the injection molded article has to be taken into consideration as the binders are being removed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
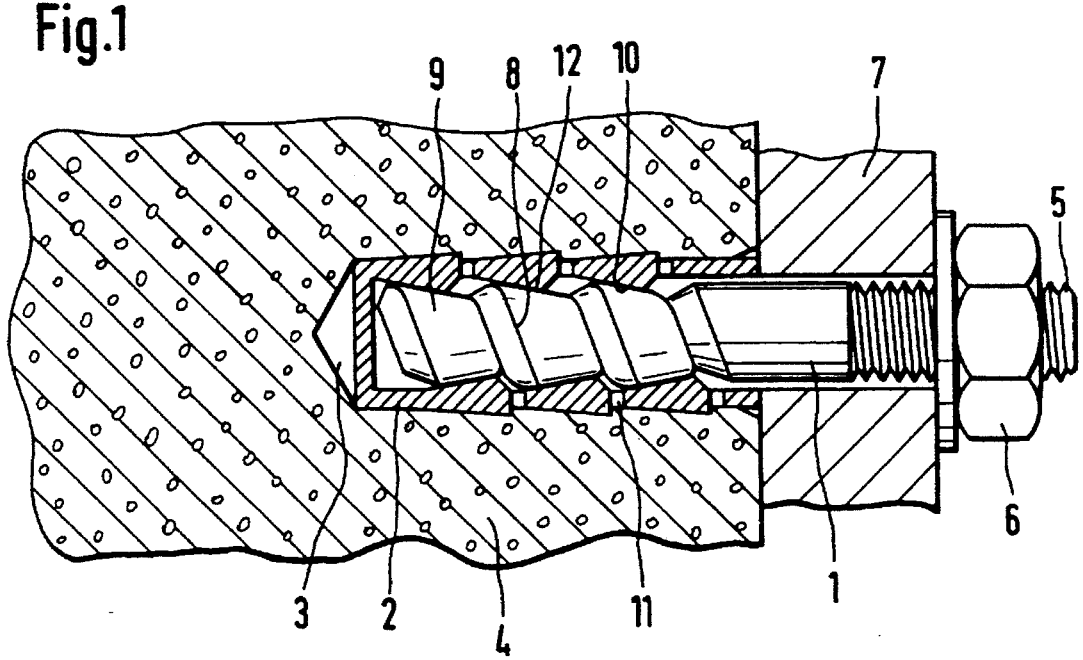
FIG. 1 is a view showing an expansible anchor in accordance with the present invention in a hole drilled in masonry.

An expansible metal anchor in accordance with the present invention as shown in FIG. 1 has a bolt 1 and an expansible sleeve 2 which is inserted in a hole 3 drilled in masonry 4. The bolt 1 has a rear end provided with an external thread 5, and a nut 6 for fixing an article 7 to the masonry 4 is screwed on the external thread. Several connected expander cones 9 which form a thread 8 are arranged at the front end of the bolt 1.

The expansible sleeve 2 has an internal thread 10 matching the thread 8 of the bolt 1. It further has expansible portions 12 lying on the expander cone 9 and formed at uniform intervals from one another along the internal thread 10 of the expansible sleeve by U-shaped channels 11. The expansible portions 12 are expanded during an axial displacement of the bolt 1 relative to the expansible sleeve 2 inserted in the hole 3 drilled in the masonry 4 as a result of screwing of the nut 6 onto the external thread 5. The expansible anchor is consequently anchored in the drilled hole 3 and at the same time the article 7 to be fixed is clamped to the outer surface of the masonry 4.

Figure 2:
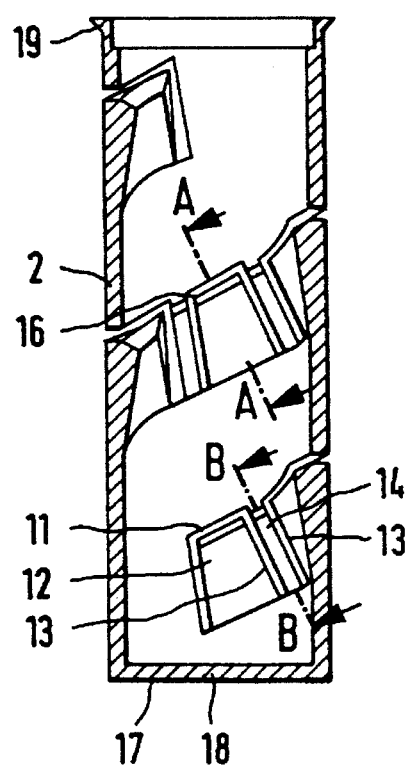
FIG. 2 is a view showing a longitudinal section of an expansible sleeve of the inventive expansible anchor.
Figure 4:
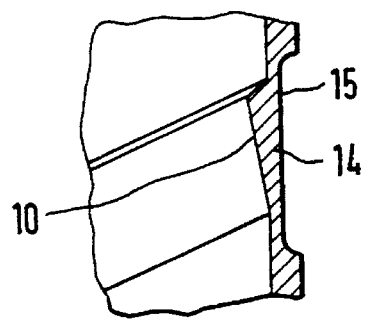
FIG. 4 is a view showing a longitudinal section of a web taken along the line B—B in FIG. 2.

As can be seen from FIG. 2 which shows the expansible sleeve 2 without the bolt 1 inserted, a web 14 remains between the channels 11 of the lateral edges 13 of two adjacent expansible portions 12. The inner wall of the web also has the contour of the thread 10. In order to reduce the drawing-in forces of the bolt 1 into the expansible sleeve 2, the outer wall of the expansible sleeve is provided with a groove 15 which is located in the region of the web 14 and reduces the wall thickness of the web. This can be seen from FIG. 4, which is a section B—B of FIG. 2.

Figure 3:
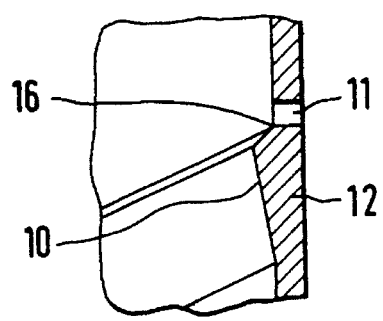
FIG. 3 is a view showing a longitudinal section of an expansible portion of the expansible sleeve taken along the line A—A in FIG. 2.

The expansible portion 12 has a channel at a front edge 16 and two lateral edges 13, as shown in FIG. 3 which is a section A—A of FIG. 2. Therefore the expansible portions 12 can expand radially.

The expansible sleeve 2 is manufactured by powder injection molding with the use of an injection molding tool which has a removable core for forming the internal thread 10 of the expansible sleeve 2. During the manufacture powdered metal is plasticized in a heated kneader using polymeric organic binders such as waxes, plastic material, etc., and subsequently granulated. The expansible sleeve is injection molded in an injection molding tool of a conventional injection molding machine, taken into account the degree of contraction. After removal of binders and sintering, the expansible sleeve assumes its final shape. Since the expansible sleeve is produced by injection molding, it is possible to close off the expansible sleeve at its front end face 17 by means of a wall 18. This wall serves at the same time as an end stop when the bolt 1 is screwed into the expansible sleeve 2. When the nut 6 is screwed onto the bolt 1, a torque may act on the expansible sleeve 2. In order to prevent co-rotation, the expansible sleeve is provided with triangular projections at its rear end to form anti-rotation elements.

Figure 5:
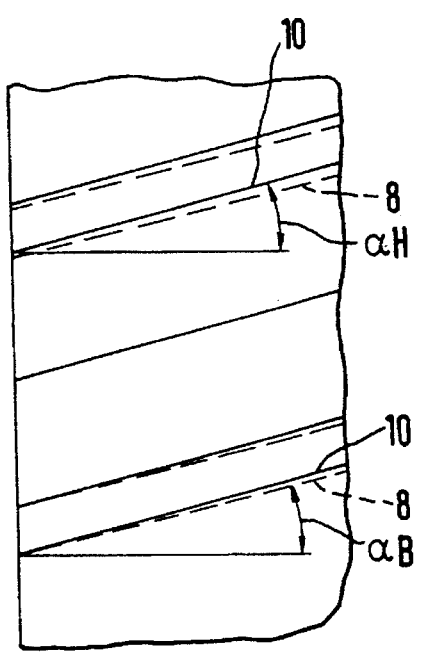
FIG. 5 is an enlarged developed view of a thread of the expansible sleeve shown in broken lines and a thread of the bolt.

An enlarged developed view of the thread 10 of the expansible sleeve 2, and also the thread 8 of the bolt in broken lines are shown in FIG. 5. It can be seen that the pitch of the thread 8 of the bolt 1 ($\alpha_B$) is somewhat less than the pitch of the thread 10 of the expansible sleeve 2 ($\alpha_H$). The preferred angle of pitch is 25°. In this way self-locking between the bolt and expansible sleeve is obtained, and it occurs approximately within the limits of an angle of pitch of 20° and 50°. The difference in pitch between the expansible sleeve and the bolt for example in a concrete part as an anchoring substrate can be approximately 0.5%. In order to compensate for this difference in pitch over the length of the thread, a corresponding clearance has to be taken into account between the two threads of the bolt 1 and the expansible sleeve 2.

It will be understood that each of the elements described above, or two or more together, may also find a useful application in other types of constructions and methods differing from the types described above.

While the invention has been illustrated and described as embodied in an expansible anchor and method of making the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansible anchor of metal, comprising a bolt having several connected expander cones forming a thread; an expansible sleeve provided with an internal thread matching said expander cones and arranged to be anchored in a hole drilled in masonry by drawing in of said bolt, said expansible sleeve having expansible portions which are formed at uniform intervals along said internal thread of said expansible sleeve by U-shaped channels.

2. An expansible anchor as defined in claim 1, wherein said expansible sleeve has a web between said channels of lateral edges of two adjacent expansible portions, said expansible sleeve having an outer wall provided with grooves which reduces a wall thickness of said web.

3. An expansible anchor as defined in claim 1, wherein said thread formed by said connected expander cones of said bolt and said internal thread in said expansible portions of said expansible sleeve have an angle of pitch between 20° and 50°.

4. An expansible anchor as defined in claim 3, wherein said angle of pitch is substantially 25°.

5. An expansible anchor as defined in claim 3, wherein said threads are formed so that there is a clearance between said threads, said internal thread of said expansible sleeve having a pitch which is slightly steeper than a pitch of said thread of said bolt.

6. An expansible anchor as defined in claim 1, wherein said expansible sleeve has a front end face and a wall which closes said front end face.

7. An expansible anchor as defined in claim 1, wherein said expansible sleeve has an outer wall provided with projections to safeguard against rotations.

8. An expansible anchor as defined in claim 7, wherein said expansible sleeve has a rear end, said projections being arranged at said rear end of said expansible sleeve.

\* \* \* \* \*